United States Patent [19]
Richardson et al.

[11] 3,975,508

[45] Aug. 17, 1976

[54] METHOD OF PREVENTION AND REMOVAL OF SULFUR DEPOSITS FROM H$_2$S ABSORPTION EQUIPMENT

[75] Inventors: Frank Peter Richardson, Lenexa; David Anthony Young, Leawood, both of Kans.

[73] Assignee: J. F. Pritchard and Company, Kansas City, Mo.

[22] Filed: Feb. 11, 1975

[21] Appl. No.: 548,980

[52] U.S. Cl. ............................ 423/571; 423/224; 423/573 R
[51] Int. Cl.$^2$ ......................................... C01B 17/04
[58] Field of Search ............ 423/571, 573, 574, 576, 423/578, 562, 224

[56] References Cited
UNITED STATES PATENTS

| | | | |
|---|---|---|---|
| 3,034,865 | 5/1962 | Urban | 423/573 |
| 3,087,793 | 4/1956 | Hay | 423/573 |
| 3,423,180 | 1/1969 | Hoeksta | 423/573 |
| 3,438,680 | 4/1969 | Scheurman et al. | 302/14 |
| 3,457,046 | 7/1969 | Hoekstra | 423/571 |
| 3,460,913 | 8/1969 | Hoekstra | 423/573 |
| 3,547,496 | 12/1970 | Kruka | 302/66 |

FOREIGN PATENTS OR APPLICATIONS

| | | | |
|---|---|---|---|
| 326,159 | 9/1920 | Germany | 423/573 |
| 858,999 | 12/1952 | Germany | 423/571 |
| 802,384 | 10/1958 | United Kingdom | 423/578 |
| 748,037 | 4/1956 | United Kingdom | 423/571 |

*Primary Examiner*—G. O. Peters
*Attorney, Agent, or Firm*—Schmidt, Johnson, Hovey & Williams

[57] ABSTRACT

A commercially feasible method is provided for controlling depositions of solid sulfur within plant equipment utilized in absorptive-regenerative processes for the removal of H$_2$S from sour gas streams which eliminates costly shutdowns and manual cleaning of the plant equipment and permits removal of solid sulfur therefrom in conjunction with that produced during the regular process itself. The method comprises adding ammonia to such H$_2$S removal systems during running thereof in order to solubilize any solid sulfur and remove the same with the sulfur produced by circulating alkali absorption solution employed. Ammonia may be added to either the sour gas stream or directly to the absorption solution, and moreover can be added intermittently to remove preexisting sulfur deposits or on a semi-continuous basis as needed to substantially prevent undesirable sulfur buildup. The present method finds application in connection with known desulfurization processes such as the Stretford, Ferrox and Takahax.

8 Claims, 1 Drawing Figure

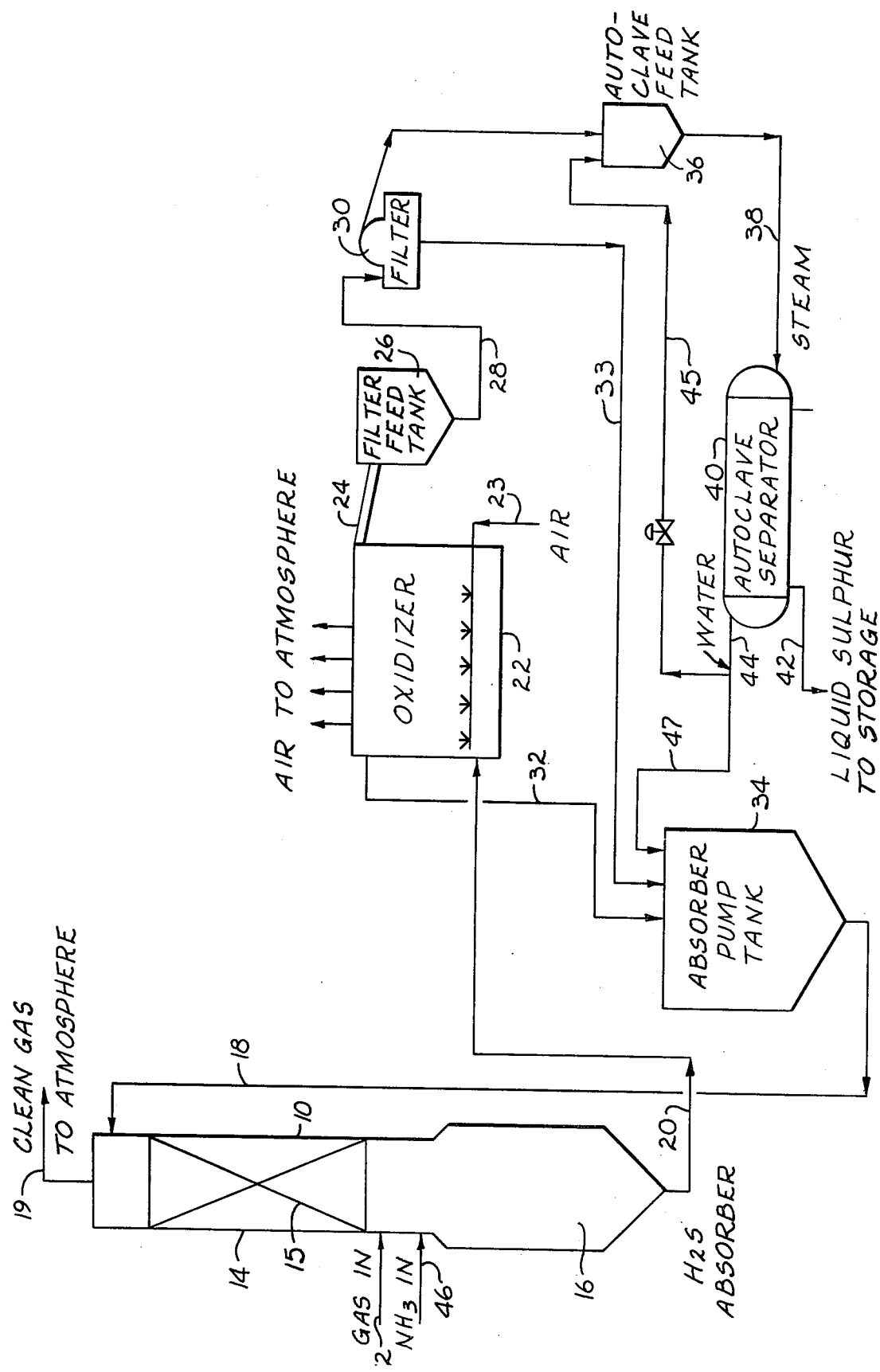

METHOD OF PREVENTION AND REMOVAL OF SULFUR DEPOSITS FROM H₂S ABSORPTION EQUIPMENT

The present invention relates to a method of controlling or regulating solid sulfur depositions within plant equipment such as $H_2S$ absorber towers utilized in conjunction with $H_2S$ removal processes such as the Stretford process. More particularly, it is concerned with such a method wherein ammonia can be selectively added to an absorptive-regenerative $H_2S$ removal process for the purpose of controlling sulfur depositions which can impede fluid and gas flow through $H_2S$ absorber towers and other plant equipment.

Natural gas and sulfur industry processing plants have for a number of years utilized a variety of processes for removing $H_2S$ from sour gas streams. In general, the gass streams are brought into contact with a circulating liquid alkali absorption solution in a contact zone such as an absorber tower, and in successive order the $H_2S$ is absorbed and converted to an alkali hydrosulfide, thereafter oxidized with a regenerative oxidizing agent to form elemental sulfur, and finally such sulfur is collected for further use. Examples of such processes are the well-known Ferrox, Stretford and Takahax processes, each of which utilize specialized absorption solutions.

While many of the absorptive-regenerative $H_2S$ removal processes presently available (and especially the Stretford process) are efficient in removing $H_2S$ from sour gas streams, workers in the art have found that in many instances solid sulfur tends to build up within plant equipment to an undesirable extent. For example, in some Stretford plants sulfur has been observed to preferentially deposit on the lower packing section of the absorber tower, and particularly along the leading edges of conventional redwood packings where intimate gas-liquid contact is made. In many instances the deposited samples consist of sulfur with alternate layers of gray-to-black sludge identified as vanadium salts. As can be appreciated, such sulfur depositions are extremely troublesome and can accumulate to the point where continued running of the plant is unfeasible. When this occurs, it is generally necessary to shut down the entire plant, remove the tower packings from the absorber, clean these packings and reinstall the same in the tower. Apart from the fact that this procedure is extremely costly in and of itself, the fact that the plant must be shut down during this cleaning period presents obvious difficulties, especially in cases where continual plant operation is essential. In order to obviate the latter problem it has been known to construct two separate absorber towers so that they can be used alternately to permit clean-up of a down tower without the necessity of complete plant shutdown. Although this expedient ameliorates the problem of undesirable plant shutdown, it will be readily apparent that it is extremely objectionable from a cost standpoint.

It is therefore the primary object of the present invention to provide a commercially feasible method for controlling undesirable sulfur depositions within plant equipment utilized with absorptive-regenerative $H_2S$ removal processes which completely eliminates costly shutdowns and the time-consuming manual procedures heretofore employed in cleaning such plant equipment. This is achieved through the addition of ammonia to the process systems during running thereof, which has unexpectedly been found to selectively solubilize preexisting sulfur deposits and moreover prevent undesirable buildup of sulfur within the systems.

As a corollary to the foregoing, it is also an object of the invention to provide a method wherein ammonia can be added either to the incoming sour gas stream or in the alternative to the recirculating alkali absorptive solution itself in order to provide the requisite ammonia concentration, and wherein the ammonia can be added intermittently to remove preexisting sulfur deposits or added semi-continuously as needed in order to substantially prevent any sulfur deposition on plant equipment.

Another object of the invention is to provide a method of the type described which is applicable to essentially all types of $H_2S$ removal processes wherein a circulating liquid alkali absorption solution is contacted with the sour gas stream, and in successive order the $H_2S$ is absorbed and converted to an alkali hydrosulfide, and thereafter oxidized with a regenerative oxidizing agent such as air to form elemental sulfur. In this connection the present invention is usable in conjunction with the well-known Stretford, Takahax and Ferrox processes in order to control the attendant sulfur deposition problem inherent in these processes.

The single FIGURE is a schematic representation of a Stretford-type system for removing $H_2S$ from a sour gas stream and incorporating therein the novel concepts of the present invention for the control of undesirable sulfur depositions.

Although the preferred process of the present invention is described herein in connection with the operation of a Stretford $H_2S$ absorbing system, it is to be appreciated that the methods hereof may be applied to other analogous $H_2S$ absorbing systems utilizing circulating liquid alkali absorption solutions, as for example, those named above. Broadly, it can be applied to any desulfurization process where conditions exist that permit the formation of ammonium polysulfides.

Referring now to the drawing, one form of the conventional Stretford process will be described. A sour gas stream containing $H_2S$ is first supplied to $H_2S$ absorber vessel 10 via supply line 12 connected to vessel 10 intermediate the upper and lower ends thereof. Absorber vessel 10 is preferably divided into an upper absorption zone or section 14 communicating directly with a holding zone or section 16 therebelow. Upper section 14 conventionally houses schematically represented packing 15 which can comprise any one of a number of readily available expedients for increasing the gas-liquid contact between a sour gas stream and a liquid absorption solution.

A typical Stretford solution is delivered to absorber 10 through line 18 for countercurrent contact with the sour gas stream from inlet 12. In this regard, such a Stretford solution may comprise, for example, 20 to 30 grams per liter of sodium carbonate (soda ash), 1 to 5 grams per liter of anthraquinone disulfonic acid, and 1 to 3 grams per liter of vanadium as sodium meta vanadate. The above chemicals, along with suitable sequestering agents, are dissolved in water to make up the preferred $H_2S$ absorption solution.

In the Stretford process, $H_2S$ from the sour gas stream initially reacts with the alkaline soda ash within absorber 10 to yield hydrosulfide (HS⁻) according to the following generalized formula:

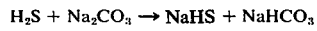

$$H_2S + Na_2CO_3 \rightarrow NaHS + NaHCO_3$$

Sodium meta vanadate also reacts with HS⁻ in tower 10 and is reduced from 5 valent to 4 valent to effect precipitation of sulfur:

$$HS^- + V(5^+) \rightarrow S\downarrow + V(4^+)$$

Simultaneously, the anthraquinone disulfonic acid reacts with 4 valent vanadium to convert it back to 5 valent, with consequent reduction of ADA:

$$V(4^+) + ADA \rightarrow V(5^+) + \text{reduced ADA}.$$

The subject Stretford solution, after absorbing H₂S from the gas admitted to vessel 10 via line 12, according to the above equations, is retained in section 16 of absorber vessel 10 for a period of about 10 minutes to allow for complete precipitation of sulfur, while clean gas substantially free of H₂S is discharged from the top of vessel 10 through line 19. The underflow from absorber vessel 10 is thereafter directed through line 20 to oxidizer 22 where the used absorption composition is turbulently mixed with air from line 23 to restore the chemical constituents in the Stretford solution to their original, active state in accordance with the reaction:

Reduced ADA + O₂ → ADA + H₂O.

Thus, the overall Stretford reaction in simplified form is:

$$2H_2S + O_2 \rightarrow 2H_2O + 2S.$$

Finely divided sulfur within oxidizer 22 is forced to the top of the liquid by the turbulently mixed air where it is gathered in an overflow forth containing from 5 to 10 percent (usually 6 to 8 percent) sulfur. This forth is delivered via line 24 to filter feed tank 26 where the sulfur sludge is accumulated. At this point the underflow sulfur is fed via line 28 to a rotary vacuum filter 30 whereupon a filter cake is formed and any excess absorption solution is fed to absorber pump tank 34 through return line 33. In addition, the underflow regenerated Stretford solution from oxidizer 22 is fed through line 32 to absorber pump tank 34.

The sulfur cake from filter 30 is next fed to autoclave 36 where heat is applied to melt the sulfur. The sulfur-water mixture so formed is then fed through line 38 with steam to autoclave separator 40, where the sulfur-water mixture is separated and liquid sulfur of greater than 99 percent purity and commercial acceptability is drawn off through line 42. The overflow from autoclave separator 40 (which contains water and Stretford absorption solution) is directed through line 44 whereupon the water is returned to autoclave feed tank 36 through line 45 and the regenerated Stretford solution is returned through line 47 to absorber pump tank 34. The collected absorption solution within tank 34 is then recirculated through line 18 to the top of absorber vessel 10 for reuse therein.

As alluded to above, a persistent problem encountered in the operation of Stretford plants has involved the undesirable precipitation and deposition of elemental sulfur on plant equipment, for example, the tower packings 15 of absorber 10. In accordance with the invention, it has been discovered that these sulfur deposits can be substantially controlled and regulated by feeding selective amounts of ammonia into the process in order to solubilize the solid sulfur and permit removal thereof with the recirculating Stretford solution. As such, the undesirable sulfur is removed simultaneously with the formation of elemental sulfur in the standard Stretford process, and this removal does not in any way impede the latter process.

As illustrated in the drawing, ammonia is shown as being introduced through separate line 46 to the central section of absorber 10; however, it is to be understood that such ammonia can be added during plant operations with the sour gas stream through line 12, or added with the Stretford solution itself. Generally speaking, any method for effecting addition of ammonia to the process is applicable, as long as the H₂S removal capabilities thereof are not unduly restricted.

In addition, it has been found that ammonia can be added to the Stretford or related processes in an intermittent fashion in order to remove any preexisting sulfur depositions within absorber 10, which normally involves injecting relatively large amounts of ammonia into the system during running thereof on a periodic basis until the plant equipment is adequately cleaned. Alternately, the sulfur concentration within absorber 10 can be monitored and ammonia added thereto as required to substantially preclude significant sulfur buildup within the tower packing components or like equipment. In either case, an unexpectedly high degree of control of sulfur depositions results, without, of course, requiring shutdown of the Stretford plant or tedious manual cleaning operations of any type.

The amount of ammonia to be added to a particular H₂S removal system of course varies with each particular case. Broadly, the amount of ammonia addition is limited on the low side only by the amount needed to effect the desired control of sulfur depositions, and on the high side only by that amount which would deleteriously effect the H₂S removal capabilities of the recirculating alakli absorption solution utilized. In addition, lesser amounts of ammonia may be successfully employed when the sour gas stream itself contains ammonia; that is, it is only necessary to add sufficient ammonia to the gas stream such that the total concentration of ammonia within the system is sufficient to effect adequate control of undesirable sulfur depositions.

In one particular Stretford plant, discussed in Example II, where the incoming sour gas stream did not contain ammonia, it was found that ammonia additions in the range of about 10 ppm (0.3 grains per 100 SCF of gas treated) to about 640 ppm (19.2 grains per SCF of gas treated) were adequate. The particular amount utilized, of course, depends upon the specific H₂S removal system in use and the type of treatment desired, i.e., whether a relatively quick clean up of preexisting sulfur depositions is required, or whether a semi-continuous cleaning is needed. However, in this instance, an ammonia concentration averaging about 350 ppm (10.9 grains per 100 SCF of gas) was sufficient to effectively clean up a badly clogged tower in about 11 days.

Finally, in the case of the Stretford process, it has been found that moderate increases in the temperature of the circulating absorption solution have the effect of enhancing the sulfur controlling capabilities of ammonia added thereto. For example, temperatures normally used in the normal Stretford process range from about 80° to 130°F., and for increased sulfur controlling activity, the operating temperature should be maintained at least above 100°F. and preferably in the range of 100°–115°F. The latter temperature range has been shown to give measurably improved sulfur control, especially when it is desired to relatively quickly clean the plant equipment.

Although the precise operation of ammonia as an agent for controlling sulfur depositions is not fully understood, it is believed that ammonia or ammonium hydroxide reacts with H₂S and elemental sulfur to form ammonium polysulfides, according to the following reversible reactons:

$$2NH_3 + H_2S + S_{(r-1)} \rightleftarrows (NH_4)_2S_r$$

or $$2NH_3 + 2H_2O \rightleftarrows 2NH_4OH$$

$$2NH_4OH + H_2S + S_{(r-1)} \rightleftarrows (NH_4)_2S_r + 2H_2O$$

In this connection it has been empirically demonstrated that $(NH_4)_2S$ will not form at a pH of below about 8.3, and accordingly the present method in general requires that sufficient levels of basicity be present in the absorption solution to permit polyfulfide formation. Of course, in a given situation if the absorption solution pH is initially too low for polysulfide formation, additional amounts of ammonia could be added to the system to raise the pH, whereupon polysulfide formation would commence and the process hereof proceed.

The ammonium polysulfides formed in the above reactions are believed to solubilize elemental sulfur according to the following reaction:

$$(NH_4)_2S_r + S_y \rightleftarrows (NH_4)_2S_{(r+y)}$$

These solubilized sulfur species are carried with the Stretford solution from tower 10 to oxidizer 22 whereupon the turbulently admixed air causes physical release of gaseous ammonia from the oxidizer and precipitation of elemental sulfur. This is believed to occur according to the following equation:

$$(NH_4)_2S_{(r+y)} + \tfrac{1}{2}O_2 \rightarrow 2NH_3 + H_2O + S_{(r+y)}$$

The latter reaction indicates that ammonia will be lost to the system over time by virtue of the physical removal therof by the oxidizer air. This hypothesis has been confirmed in practice by the observation that ammonia does not remain indefinitely in the Stretford solution but rather passes therefrom over time subsequent to its introduction.

The following examples are given merely as illustrations of the present sulfur controlling method, but nothing therein is to be taken as a limitation on the overall scope of the invention.

EXAMPLE I

A series of laboratory experiments were undertaken to demonstrate the ability of ammonia in a standard Stretford solution (as defined above) to dissolve sulfur deposits taken from a commercially operational absorber tower in a Stretford plant. The sulfur deposits were placed in pint jars along with dissolving solutions consisting of the standard Stretford solution in conjunction with varying amounts of aqueous ammonia. The pint jars were then placed on rollers normally used for a ball mill in order to provide mild agitation. The sulfur samples were weighed dry at the beginning and end of the tests, but weighed wet with the solutions in order to follow the course of the experiments as they proceeded. In addition, H₂S was bubbled through all of the solutions for 1 minute at the commencement of the respective tests and certain of the solutions were heated in order to more effectively simulate conditions in the Stretford absorber tower.

The results of the above described experiments are set forth below:

TABLE I

| SOLUTION COMPOSITION | CONTROL | A | SOLUTION B | C | D |
|---|---|---|---|---|---|
| a) Stretford solution | 200 cc | 100 cc | 150 cc | 165 cc | 165 cc |
| b) Aqueous NH₃ (29.7 wt % NH₃) | — | 100 cc | 70 cc | 35 cc | 35 cc |
| c) H₂S gas bubbled into solution for one minute | No | Yes | Yes | Yes | Yes |
| Dry starting weight of single piece sulfur deposits (grams) | 2.3 | 4.1 | 6.0 | 4.6 | 5.9 |

| TEST CONDITIONS | | | | | |
|---|---|---|---|---|---|
| TEST 1. Starting temperature | RT¹ | 126°F. | 81°F. | 81°F. | 140°F. |
| Time on rollers, min. | 40 | 105 | 40 | 105 | 45 |
| Sulfur wt (wet), gms. | 2.7 | 0 | 5.8 | 0.6 | 2.4 |
| TEST 2. Starting temperature | RT¹ | | 127°F. | | 120°F. |
| Time on rollers, min. | 60 | | 55 | | 60 |
| Sulfur wt (wet), gms. | 2.7 | | 4.7 | | 0.9 |
| TEST 3. Starting temperature | 149°F. | | 126°F. | | 154°F. |
| Time on rollers, min. | 35 | | 70 | | 70 |
| Sulfur wt (wet), gms. | 2.7 | | 1.8 | | 0.3 |
| TEST 4. Starting temperature | 162°F. | 138°F. | | 118°F. | 135°F. |
| Second sulfur deposit added, gms. | | 21.0 | | — | 5.1 |
| Time on rollers, min. | 32 | 65 | | 55 | — |
| Sulfur wt (wet), gms. | 2.6 | 16.1 | | 1.4 | — |
| TEST 5. Starting temperature | 147°F. | 147°F. | | | 135°F. |
| Time on rollers, min. | 45 | 55 | | | 52 |
| Sulfur wt (wet), gms. | 2.6 | 13.8 | | | 3.9 |

TABLE I-continued

| TEST | | | | | | |
|---|---|---|---|---|---|---|
| 6. | Starting temperature | — | 149°F. | | | 144°F. |
| | Time on rollers, min. | — | 30 | | | 47 |
| | Sulfur wt (dry), gms. | — | 11.5 | 0.9 | | 2.4 |
| Cumulative loss of sulfur, weight percent | | 9% | 54% | 85% | 87% | 78% |
| Total time on rollers, hrs. | | 3.5 | 4.25 | 2.75 | 1.75 | 4.50 |

[1]These tests run at room temperature, about 72–74°F.

The control test utilizing only the standard Stretford solution gave very unfavorable results, viz, only a 9% loss of sulfur from the deposit. Accordingly, it was apparent that the Stretford solution alone could not be relied upon to handle the problem of sulfur deposition, in conformity with actual experience with plants of this type.

Solution A heated to a temperature of about 126° F. produced the most rapid attack. This solution consisted of Stretford solution with 14.8 by weight ammonia before addition of the hydrogen sulfide. Within 1¾ hours, the entire 4 gram sulfur deposit initially utilized was dissolved. To further test this solution, an additional 2.1 gram sample was added. The latter was reduced to a 12½ gram deposit following an additional 2½ hour treatment. The net effect of this test was that about 13 grams of the sulfur deposit were dissolved in the 200 cc solution sample.

Solution B consisted of 150 cc of standard Stretford solution with 70 cc of aqueous ammonia, or 10 weight % ammonia in Stretford solution. In 2¾ hours on the rollers, the sample lost 5.1 grams in weight. It is believed that the somewhat slower rate of attack exhibited by this solution stemmed primarily from the fact that the sulfur deposit samples utilized in the various tests were not homogeneous, and could have come from different locations in a given absorber tower.

Test solutions C and D were run as duplicates at different temperatures, each containing 5 weight % ammonia in Stretford solution before $H_2S$ bubbling. With 1¾ hours contact on the rollers, the sulfur samples utilized were reduced to 0.6 and 0.9 grams in wet condition, again indicating substantial attack. The solution D test was continued for another hour on the rollers, which reduced the wet weight of the sample to 0.3 grams. In an effort to duplicate further steps in the Stretford process, air was then bubbled through solution D using a plastic frit, and the froth removed to a filter paper. This step was repeated 10 times in an attempt to comprehensively remove any sulfur that could be frothed. The filter paper wass dried in an oven and weighed, showing a net increase of only 0.9 grams of sulfur removed as froth. This contrasts with a sample loss before air bubbling of 5.6 grams. Thus, the sulfur recovered by frothing and drying amounted to only 16% of the sample weight previously dissolved. Subsequent to the frothing test, a new sample of the tower deposit was added to the solution, and rolling continued for an additional two hours. A weight loss of 2.7 grams was achieved during this time, indicating little loss in solution activity for dissolving further tower deposits. Finally, $H_2S$ was again bubbled through the solution for one minute in order to duplicate the recycling of the Stretford solution. This had the effect of completely changing the appearance and dissolving the sulfur sludge, indicating formation of polysulfides with subsequent solubilization of elemental sulfur.

It will be apparent from the foregoing that the capacity of Stretford solution having ammonia and $H_2S$ therein to dissolve elemental sulfur is substantial with the samples being reduced in weight from 54 to 87%. Moreover, with solution A, 13.6 grams of sulfur were dissolved in 200 cc of solution giving a concentration of 68 grams of dissolved sulfur per liter, or 144.5 grams of ammonium sulfide. This concentration was achieved in 4½ hours of testing with no indication that solution activity was diminished or that maximum solubility had been reached.

EXAMPLE II

The present method was also tested in a commercial setting on a badly plugged absorber tower forming a part of the Stretford plant of an operating natural gas treatment facility. In this test, the absorber tower was badly backed up with sulfur deposits as indicated by a gas flow of 15 to 16 MM SCFD (million standard cubic feet per day) Stretford solution circulation rate of 260 GPM (gallons per minute) and $\Delta P$ back pressure of 8 to 9 psi across the tower. This tower was designed to operate at conditions approximating 16 MM SCFD, 450 and $\Delta P$ of approximately 1 psi.

Quantities of anhydrous ammonia were intermittently added to the Stretford solution holding tank during actual plant operation while the gas flow was held essentially constant, and the operating temperature varied from 90° to 105° F. The resultant cleaning of the tower from the periodic ammonia additions was measured by increased gas flow rates and decrease in $\Delta P$ across the tower. These results are set forth in the following table:

TABLE II

| TIME | GAS FLOW MM SCF/O | $\Delta P$(psi) | STRETFORD SOLUTION CIRCULATION RATE (GPM) | $NH_3$ ADDED (LBS) |
|---|---|---|---|---|
| [2]Initiation | | | | |
| Day 1 | 15–16 | 8.0–9.0 | 260 | — |
| 5 Hrs. | 15–16 | 6.5–7.0 | 260 | (4 hrs) 850 |
| 12½ Hrs. | 15–16 | 3.6 | 260 | — |
| 14½ Hrs. | 15–16 | 0.9 | 260 | — |
| Day 2 | | | | |
| [3]20½ Hrs. | 15–16 | 0.9 | 260 | — |
| [4]21½ Hrs. | 15–16 | 14.0 | 450 | — |
| Day 3 | 15–16 | 10.0 | 300 | 300 |

TABLE II-continued

| TIME | GAS FLOW MM SCF/O | ΔP(psi) | STRETFORD SOLUTION CIRCULATION RATE (GPM) | NH₃ ADDED (LBS) |
|---|---|---|---|---|
| Day 4 | 15–16 | 1.5 | 330 | — |
| Day 6 | 15–16 | 1.5 | 390 | 200 |
| Day 6 | 15–16 | 14.0 | 420 | — |
| Day 6 | 15–16 | 10.0 | 400 | — |
| Day 8 | 15–16 | 10.0 | 400 | 650 |
| [5]Day 9 | 15–16 | 10.0 | 390 | — |
| Day 11 | 15–16 | 3.0 | 440 | — |
| Day 16 | 15–16 | 1.2 | 450 | — |

[1]Figures represent major additions of $NH_3$; other minor additions not shown made total $NH_3$ added in test amount[3] to about 2500 lbs.
[2]$H_2S$ removal efficiency at initiation was 0.2 grains/100 SCF $H_2S$ at tower exit.
[3]$H_2S$ removal efficiency at 20½ hours was 0.04 grains/100 SCF at tower exit.
[4]Solution circulation rate was temporarily raised at 21½ hours to test tower; it was thereafter lowered to 300 GPM while the test proceeded.
[5]At this point, the operating temperature of the tower was increased to about 115°F.

As will be apparent from a study of the table, the overall effect of adding approximately 2500 lbs. of ammonia to the system was to increase the measured operational parameters to 450 GPM solution flow and about 1.2 psi ΔP across the tower, while the gas flow remained essentially constant at 15–16 MMSCFD.

Two minor additions of ammonia were also made during the four succeeding months of the test in order to maintain the cleanliness of the tower. These additions amounted to 100 and 200 pounds of ammonia respectively, and were effective to keep the pressure drop across the tower at a level of from about 1.5 to 2.0 psi.

This test demonstrated a number of important facts pertaining to the method disclosed herein. First of all, traces of ammonia gas were found to be in the exit gas from the plant, which was operating at a pressure of about 150 psig. However, some ammonia odor was apparent from the oxidizer. This latter observation confirmed the hypothesis that ammonia in gaseous form was removed from the Stretford solution during each pass through the oxidizer. For example, during the initial ammonia treatment of the tower, about 850 lbs. of ammonia were added to the Stretford solution in a 4 hour period, and no additional ammonia was added until day 3. During this time approximately 11½ million cubic feet of air were passed through the oxidizer, which had the effect of substantially removing the ammonia from the system. Thus, on the average of 74 pounds of ammonia were removed for each million cubic feet of air through the oxidizer. It is therefore apparent that substantially all of the ammonia added to the process will eventually be removed from the solution, the majority at the oxidizer. It is estimated that this removal rate will average 50 to 75 pounds of ammonia per million cubic feet of air. Using this data it is possible to approximate the amount of ammonia needed over time in order to reach or maintain a desired ammonia concentration in the system.

It will also be clear that the operational time required for sulfur removal is limited primarily by the practicalities of control and observation rather than the solubility of sulfur in Stretford-ammonia solution. For example, a large quantity of ammonia can be used to quickly clean a tower if needed, but on the other hand, a uniform utilization of smaller amounts of ammonia will likewise be equally effective, but of course the time required will be greater in the latter case.

Finally, the beneficial effects of moderate raises in operating temperature are demonstrated in the time span between days 9–11. At day 9 the temperature was increased to 115° which permitted rapid cleanup of the tower and gave the excellent final results alluded to above.

Having thus described the invention, what is claimed as new and desired to be secured by Letters Patent is:

1. In a Stretford-type process for removing $H_2S$ from a sour gas stream wherein the gas is brought into contact with a circulating liquid alkali absorption stream containing a quinone in a contact zone, and in successive order the $H_2S$ is absorbed, converted to an alkali hydrosulfide, oxidized with a regenerative oxidizing agent to form elemental sulfur with consequent reduction of the oxidizing agent, with the reduced oxidizing agent being reoxidized by said quinone, there being an attendant tendency for such elemental sulfur to collect in the zone and impede liquid and gas flow therethrough, the improvement which comprises the steps of:
   adding ammonia to at least one of said streams in amounts sufficient to control the collection of sulfur in said zone and ranging from about 10 ppm to that concentration of ammonia which may deleteriously affect the absorption capability of said alkali stream; and
   maintaining the ammonia added at a level to control said sulfur collection by the solubilization and subsequent removal thereof from said zone with said circulating liquid.

2. The improvement of claim 1 including the step of adding ammonia to said alakali stream.

3. The improvement of claim 1 including the step of adding ammonia to said sour gas stream.

4. The improvement of claim 1 including the step of adding said ammonia intermittently to substantially solubilize any sulfur depositions in said zone.

5. The improvement of claim 1 including the step of adding ammonia as required to substantially prevent sulfur deposition within said zone.

6. The improvement of claim 1 including the step of adding ammonia in an amount ranging from about 10 ppm to about 640 ppm.

7. The improvement of claim 1 wherein is included the step of operating said process at a temperature in the range of about 80° to 130° F.

8. The improvement of claim 7 wherein is included the step of operating said process at a temperature above about 100° F.

* * * * *